(12) United States Patent
Hayden et al.

(10) Patent No.: US 10,823,657 B2
(45) Date of Patent: Nov. 3, 2020

(54) FLOW CELL FOR ANALYZING PARTICLES IN A LIQUID TO BE EXAMINED

(71) Applicant: Siemens Healthcare GmbH, Erlangen (DE)

(72) Inventors: Oliver Hayden, Moosburg (DE); Lukas Richter, Hirschaid (DE); Matthias Ugele, Neumarkt (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/065,789

(22) PCT Filed: Dec. 23, 2015

(86) PCT No.: PCT/EP2015/081156
§ 371 (c)(1),
(2) Date: Jun. 22, 2018

(87) PCT Pub. No.: WO2017/108129
PCT Pub. Date: Jun. 29, 2017

(65) Prior Publication Data
US 2019/0011350 A1 Jan. 10, 2019

(51) Int. Cl.
*G01N 15/14* (2006.01)
*G01N 15/00* (2006.01)
*G01N 15/10* (2006.01)

(52) U.S. Cl.
CPC ....... *G01N 15/1404* (2013.01); *G01N 15/147* (2013.01); *G01N 15/1459* (2013.01);
(Continued)

(58) Field of Classification Search
CPC .......... G01N 15/1404; G01N 15/1459; G01N 15/147; G01N 2015/0073;
(Continued)

(56) References Cited

U.S. PATENT DOCUMENTS 3,826,364 A * 7/1974 Bonner ................. B07C 5/3425
209/3.1
5,927,380 A * 7/1999 Scoccia .............. B60H 1/00792
165/11.1
(Continued)

FOREIGN PATENT DOCUMENTS

CN 1871058 A 11/2006
CN 101517410 A 8/2009
(Continued)

OTHER PUBLICATIONS

Nilsson, Andreas et al., "Manipulation of Suspended Particles in a Laminar Flow," in Micro Total Analysis Systems, 2002, vol. 2, pp. 751-753.
(Continued)

*Primary Examiner* — Mohamed K Amara
(74) *Attorney, Agent, or Firm* — Dugan & Dugan, PC

(57) ABSTRACT

The invention relates to a device for examining particles in a liquid to be examined, comprising a flow passage through which the liquid to be examined is moved. The flow passage has at least one inlet through which at least one sheath fluid flows into the flow passage such that the at least one sheath fluid forms at least one sheath flow in the flow passage. The device further comprises a wave generating device for piezoacoustically generating sound waves which propagate through the flow passage transversely to the flow direction of the liquid to be examined and form wave nodes on a monitoring plane such that particles to be examined of the liquid to be examined are moved onto the monitoring plane and accumulate thereon on the basis of the pressure effect of the sound waves in the transverse direction.

17 Claims, 5 Drawing Sheets

(52) U.S. Cl.
CPC ..... *G01N 15/1463* (2013.01); *G01N 15/1475* (2013.01); *G01N 2015/008* (2013.01); *G01N 2015/0073* (2013.01); *G01N 2015/0084* (2013.01); *G01N 2015/1006* (2013.01); *G01N 2015/142* (2013.01); *G01N 2015/1415* (2013.01); *G01N 2015/1465* (2013.01)

(58) Field of Classification Search
CPC ....... G01N 2015/142; G01N 2015/008; G01N 2015/0084; G01N 2015/1006; G01N 15/1475; G01N 15/1463; G01N 2015/1415; G01N 2015/1465; G01N 15/1484; G01N 2015/1411; G01N 2015/1413; G01N 2015/149; G01N 2015/1497; G01N 21/6408; G01N 21/6486; G01N 29/2437; G01N 33/4915; G01N 33/5005; G01N 33/5044; B01L 2200/0636; B01L 3/502761; B01L 2200/0647; B01L 2200/0652; B01L 2200/10; B01L 2300/0864; B01L 2300/0867; B01L 3/502776

See application file for complete search history.

(56) References Cited

U.S. PATENT DOCUMENTS

| | | | | |
|---|---|---|---|---|
| 5,980,378 | A * | 11/1999 | Wieszt | B60H 3/0085 454/75 |
| 6,778,263 | B2 * | 8/2004 | Ortyn | G01N 15/1012 356/28 |
| 6,830,729 | B1 * | 12/2004 | Holl | G01N 15/14 356/246 |
| 7,161,665 | B2 * | 1/2007 | Johnson | G01N 15/1459 356/338 |
| 7,340,957 | B2 * | 3/2008 | Kaduchak | G01N 15/1459 73/570.5 |
| 7,709,821 | B2 * | 5/2010 | Casstevens | G01J 3/02 250/458.1 |
| 7,997,831 | B2 | 8/2011 | Gilbert et al. | |
| 8,149,418 | B2 * | 4/2012 | Tearney | G01N 21/4795 356/479 |
| 8,182,987 | B2 * | 5/2012 | Miyawaki | A01K 67/0275 435/320.1 |
| 8,273,294 | B2 * | 9/2012 | Padmanabhan | G01N 15/1404 422/63 |
| 8,304,245 | B2 * | 11/2012 | Kuypers | G01N 33/5094 436/63 |
| 8,502,148 | B2 * | 8/2013 | Wagner | G01N 21/1702 250/338.1 |
| 8,563,325 | B1 * | 10/2013 | Bartsch | B01L 3/502776 436/180 |
| 8,714,014 | B2 * | 5/2014 | Kaduchak | G01N 15/1404 73/570.5 |
| 8,939,823 | B2 * | 1/2015 | Kanemaru | B60H 1/00471 454/139 |
| 8,941,826 | B2 * | 1/2015 | Nawaz | B01L 3/502776 356/246 |
| 9,013,692 | B2 * | 4/2015 | Hu | G01N 15/147 250/459.1 |
| 9,316,635 | B2 * | 4/2016 | Farrell | G01N 15/147 |
| 9,364,831 | B2 * | 6/2016 | Chiou | F16K 99/0026 |
| 9,365,822 | B2 * | 6/2016 | Seidel | G01N 1/30 |
| 9,372,143 | B2 * | 6/2016 | Yamamoto | G01N 15/1434 |
| 9,423,335 | B2 * | 8/2016 | Gabriel | G01N 33/502 |
| 9,682,610 | B2 * | 6/2017 | Duan | B60H 1/00764 |
| 9,695,390 | B2 * | 7/2017 | Weitz | F17D 3/01 |
| 9,757,726 | B2 * | 9/2017 | Sharpe | G01N 15/1459 |
| 9,764,623 | B2 * | 9/2017 | Fruehsorger | B60H 3/06 |
| 9,802,463 | B2 * | 10/2017 | Maeda | B60H 1/00849 |
| 9,835,552 | B2 * | 12/2017 | Wagner | G01N 15/147 |
| 9,855,382 | B2 * | 1/2018 | Leach | A61M 1/3678 |
| 9,931,909 | B2 * | 4/2018 | McNew | B60H 1/0073 |
| 9,995,667 | B2 * | 6/2018 | Hart | G01N 15/06 |
| 10,059,171 | B2 * | 8/2018 | Gesell | B60H 1/24 |
| 10,131,200 | B2 * | 11/2018 | Patti | B60H 1/00792 |
| 10,161,837 | B2 * | 12/2018 | Ajay | G08B 17/10 |
| 10,195,921 | B2 * | 2/2019 | Wagner | B60H 1/00764 |
| 10,337,790 | B2 * | 7/2019 | Sato | F25D 29/003 |
| 10,371,622 | B2 * | 8/2019 | Sharpe | B01L 3/502761 |
| 10,386,290 | B2 * | 8/2019 | Kaduchak | G01N 15/1404 |
| 2002/0119558 | A1 * | 8/2002 | Seidel | A01K 67/027 435/287.1 |
| 2003/0096430 | A1 * | 5/2003 | Holl | B01F 5/0646 436/177 |
| 2003/0175980 | A1 * | 9/2003 | Hayenga | B01L 3/502738 436/63 |
| 2004/0070757 | A1 | 4/2004 | Moore et al. | |
| 2004/0089798 | A1 | 5/2004 | Gruber et al. | |
| 2005/0112541 | A1 * | 5/2005 | Durack | C12N 5/0612 435/2 |
| 2006/0037915 | A1 * | 2/2006 | Strand | B01D 21/283 210/748.05 |
| 2009/0029870 | A1 * | 1/2009 | Ward | G01N 15/12 506/9 |
| 2009/0158823 | A1 * | 6/2009 | Kaduchak | G01N 15/1404 73/61.75 |
| 2009/0178716 | A1 | 7/2009 | Kaduchak et al. | |
| 2009/0311800 | A1 | 12/2009 | Bond | |
| 2010/0009333 | A1 | 1/2010 | Auer | |
| 2011/0008767 | A1 | 1/2011 | Durack | |
| 2011/0063602 | A1 * | 3/2011 | Pittaro | G01N 15/14 356/28 |
| 2011/0134426 | A1 * | 6/2011 | Kaduchak | G01N 15/1404 356/337 |
| 2012/0035061 | A1 | 2/2012 | Bransky et al. | |
| 2012/0140205 | A1 * | 6/2012 | Kaduchak | G01N 33/56966 356/39 |
| 2013/0139575 | A1 | 6/2013 | Lee et al. | |
| 2014/0008307 | A1 | 1/2014 | Guldiken et al. | |
| 2014/0033808 | A1 | 2/2014 | Ding et al. | |
| 2014/0147860 | A1 | 5/2014 | Kaduchak et al. | |
| 2014/0273067 | A1 | 9/2014 | Wanders et al. | |
| 2014/0336062 | A1 | 11/2014 | Graves et al. | |

FOREIGN PATENT DOCUMENTS

| | | |
|---|---|---|
| CN | 101971247 A | 2/2011 |
| CN | 104968417 A | 10/2015 |

OTHER PUBLICATIONS

Yasuda, Kenji, Blood Concentration by Superposition of Higher Harmonics of Ultrasound,: in Jpn. J. Appl. Phys. 1997, vol. 36, pp. 3130-3135.

Laurell, Thomas et al., "Chip Integrated Strategies for Acoustic Separation and Manipulation of Cells and Particles," in Chemical Society Reviews, 2007, vol. 36, pp. 492-506; DOI:10.1039/b601326k.

International Search Report and Written Opinion of International Application No. PCT/EP2015/081156 dated Sep. 20, 2016.

Office Action of U.S. Appl. No. 16/090,205 dated Aug. 28, 2019.

Final Office Action of U.S. Appl. No. 16/090,205, dated Jan. 24, 2020.

Search Report of CN Application 201580085501.7 (Equivalent of U.S. Appl. No. 16/065,789) dated Jan. 17, 2020.

* cited by examiner

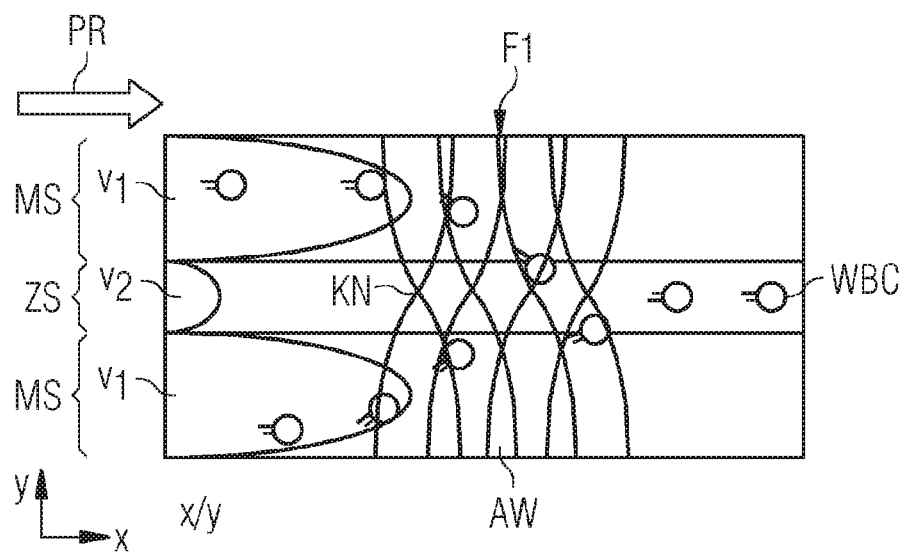
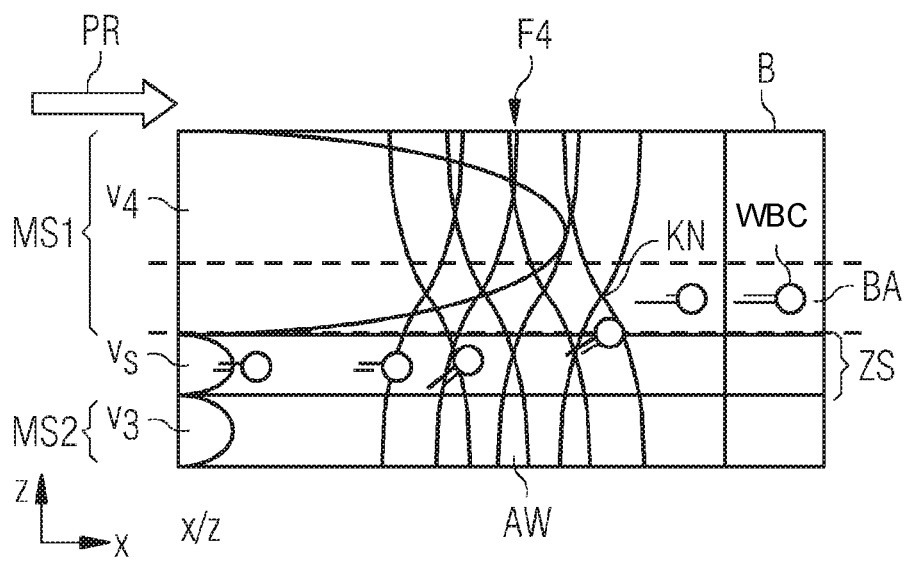

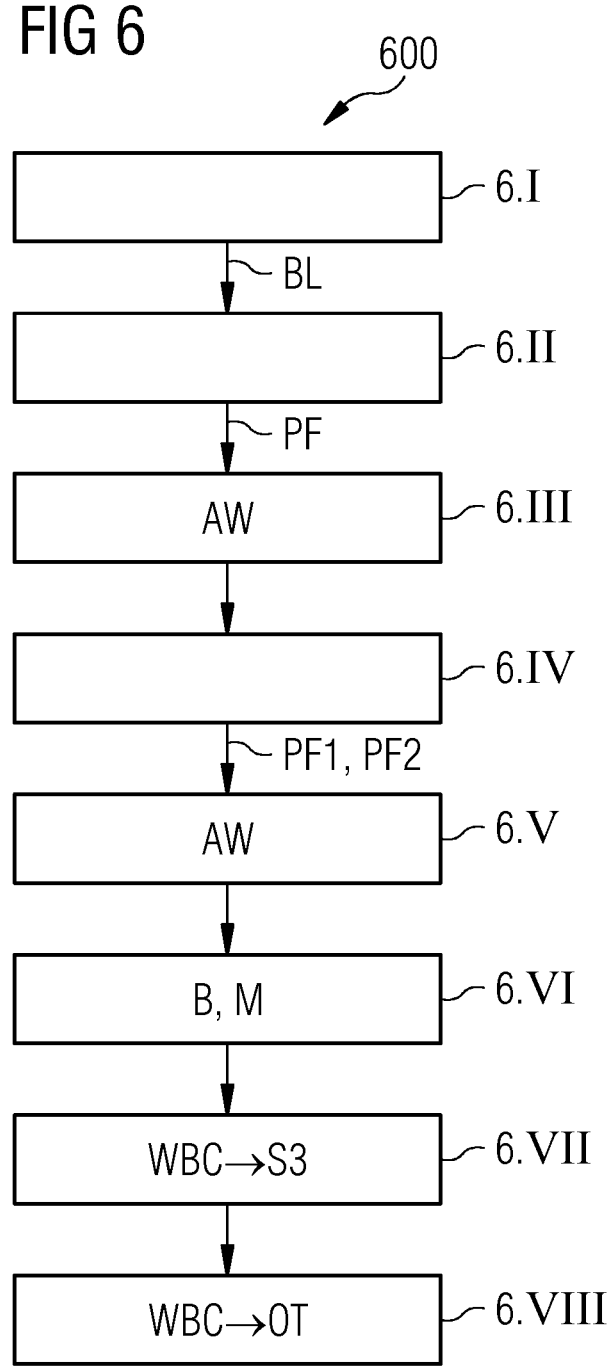

FLOW CELL FOR ANALYZING PARTICLES IN A LIQUID TO BE EXAMINED

CROSS REFERENCE TO RELATED APPLICATION

This is a 371 of PCT/EP2015/081156, filed Dec. 23, 2015, the disclosure of which is hereby incorporated by reference herein in its entirety for all purposes.

FIELD

The invention relates to an apparatus for examining particles in a liquid to be examined. Furthermore, the invention relates to an apparatus for microscopic observation of particles in a liquid to be examined. Additionally, the invention relates to a method for examining particles in a liquid to be examined. Moreover, the invention relates to the use of a flow cell and a wave-producing device for piezo-acoustic production of sound waves.

BACKGROUND

Blood consists of a plurality of constituents, which are present in the blood in different concentrations. Red blood cells, also referred to as erythrocytes, make up 98% of the blood; by contrast, blood platelets, also referred to as thrombocytes, only comprise 1.9% of the blood and white blood cells, also referred to as leukocytes, actually only make up an amount of 0.1% of the blood. If the intention is to examine only the blood constituents of low proportions, i.e., the blood platelets or the white blood cells, there are two possible procedures. Either the red blood cells, which are present up to 1000 times more frequently, are detected together with the cell type of interest, i.e., the thrombocytes or the leukocytes, or the red blood cells are removed prior to the analysis in order to correspondingly accumulate the constituents of interest in the analysis liquid.

The overall analysis time lengthens considerably in the case of the first type of procedure, namely by a factor corresponding to the ratio between the amount of red blood cells and the amount of the cell type to be analyzed. Moreover, the amount of data to be processed increases drastically in the process. In the second type of procedure, a work step is required prior to the actual analysis, the constituents of the blood not intended to be analyzed being removed from the analysis liquid in said work step. An acceptable reduction in the analysis time is only achieved in the second procedure.

Conventional analysis methods are based on electrical methods, such as the Coulter principle, for example. The principle of the Coulter counter is based on measuring the change of the mean electrical conductivity between two electrodes. These are immersed in an electrically conductive liquid, which contains particles with a conductivity that differs from the liquid. The measuring device used during the method comprises two measurement chambers. A measurement electrode is arranged in each of the two chambers, which are separated from one another by way of a narrow opening. Here, the size of the opening is determined by the size of the particles to be examined.

Other conventional analysis methods are based on optical methods. Flow cytometry should be mentioned in this context. Here, cells to be examined are analyzed in a liquid, said cells individually passing an electric field or a light beam at high speed. Depending on the form, structure or color of the cells, different effects arise, the properties of the respective cell being ascertained on the basis thereof. By way of example, this principle is used in hematology analysis appliances or fluorescence flow cytometers. Within the scope of fluorescence flow cytometry, cells that have been provided with a fluorescent marker are sorted into different reagent vessels depending on the staining.

Furthermore, microscopy is also used to analyze blood constituents. Here, cells are stained on an object carrier, for example, and observed by a microscope. A high throughput of cells to be examined can be reached if staining of cells with fluorescent substances and microscopic observation with flow cytometry are combined.

For the purpose of separating particles to be examined in liquids, use is also made of methods with highly viscous sheath liquids (referred to as sheath flows) and piezo-acoustic cell separation. Such methods are described in, for example, US 2004/0070757 A1, US 2010/0009333 A1, Laurel et al., Chem. Soc. Rev., 2007, 36, 492-506 and A. Nilsson et al., Micro Total Analysis Systems 2002, Kluwer Academic Publishers, Nara, Japan 2002.

However, the aforementioned methods, up until now, have not been used to accumulate weakly concentrated constituents of liquids to be examined.

SUMMARY

It is therefore an object of the present invention to specify an improved apparatus and a corresponding method for examining particles in a liquid to be examined, which are also suitable for analyzing weakly concentrated particles in liquids to be examined.

This object is achieved by an apparatus for examining particles in a liquid to be examined according to patent claim 1, an apparatus for microscopic observation of particles in a liquid to be examined according to patent claim 12, a method for examining particles in a liquid to be examined according to patent claim 14 and the use of a flow cell and a wave-producing device for piezo-acoustic production of sound waves according to patent claim 15.

The apparatus according to the invention for examining particles in a liquid to be examined has a process stage for separating and positioning the particles to be examined. The process stage comprises a flow passage, through which the liquid to be examined is moved at a first flow rate. Such a flow passage is preferably embodied in such a way that the liquids flowing through the flow passage exhibit laminar flow. To this end, suitable diameters of the flow passage and the flow rates or the flow speeds of the liquids flowing through the first flow passage are chosen. By way of example, the flow passage can be realized by the use of a conduit element or a pipe-like component, which is preferably optically transparent. A flow rate should be defined as a liquid volume flowing through a cross section per unit time.

The flow passage comprises at least one inlet, through which at least one sheath liquid in each case flows into the flow passage at at least one second flow rate such that the at least one sheath liquid forms at least one sheath flow in the flow passage and the liquid to be examined flows through the flow passage longitudinally in relation to the at least one sheath flow. Thus, in this context, a sheath flow should be understood to mean a liquid flow that surrounds another liquid flow at least in one direction or that flows past the other liquid flow on one side of the latter in the flow direction thereof, with the sheath flow and the latter flowing in the same direction. However, the sheath flow can have a different speed and a different flow rate to the other liquid flow surrounded thereby or flowing at the side thereof. Usually, so-called buffer solutions are used as sheath flow liquid, also referred to as sheath liquid, particles to be examined being preserved or protected from changes by the carrier liquid in said buffer solutions.

Moreover, the apparatus according to the invention for examining particles in a liquid to be examined comprises a wave-producing device for piezo-acoustic production of sound waves. A piezo-acoustic production of sound waves is understood to mean the periodic, electrical excitation of piezo-ceramic vibration elements. In the process, the piezo-ceramic vibration elements are excited to perform a mechanical vibration with the aid of an electric field or an electric voltage, sound waves in turn being brought about by said mechanical vibration and propagating in the liquids flowing through the flow passage. The formation of standing waves is achieved by arranging reflection elements opposite to the wave-producing device. In the simplest case, the sidewall of a pipe conduit, for example, which surrounds and guides the liquids flowing through the flow passage, suffices to this end.

The sound waves produced with the aid of the piezo-ceramic vibration elements propagate through the flow passage transversely to the flow direction of the liquid to be examined and form wave nodes in an observation plane such that, on account of the effect of pressure of the sound waves in the transverse direction, particles to be examined of the liquid to be examined are displaced into the observation plane and are accumulated there. An accumulation of the particles to be examined in the observation plane is achieved because the specific kinematic behavior of the particles to be examined under the influence of sound waves is used when displacing said particles to be examined. By way of example, particles with relatively large dimensions in comparison with the remaining particles are moved by the sound waves at a higher speed in the transverse direction than smaller particles. By way of example, this speed difference can be used to accumulate a significantly greater number of larger particles in the observation plane than unwanted smaller particles.

The particles to be examined are conveyed up to the wave nodes in the propagation direction of the sound waves, at which point said particles are no longer exposed to a force in the transverse direction and therefore only continue to move onward in the flow direction. An observation plane or an observation region comprises a portion in the flow passage that is tightly delimited in the transverse direction to the flow direction, objects, in particular the particles to be examined, being able to be observed in focus in said portion by means of an optical observation device used to observe the particles to be examined. Thus, the extent of the observation region in the transverse direction depends on the depth of field of the employed optical observation device. Further, the position of the observation region in the transverse direction depends on the setting and the arrangement of the optical observation device.

When actuating the inlets or devices for moving the liquids, the value of the at least one second flow rate is chosen in such a way that the at least one sheath flow has a predetermined cross section such that the observation plane or the observation region extends through the at least one sheath flow and the particles to be examined are accumulated in the at least one sheath flow or the at least one sheath liquid. The choice or control of the flow rates can be effectuated by way of a control device, which calculates values for the individual flow rates in advance and matches these to one another and actuates the drive elements for producing the individual flows of the sheath liquids and of the liquid to be examined according to the ascertained flow rates.

Thus, the central flow is decentered in this manner such that particles to be examined can be shifted into a preferably highly transparent sheath flow upon separation from the central flow and, at the same time, are situated there in the observation plane or the observation region. Then, the particles to be examined separated thus can be observed easily downstream in the preferably highly transparent sheath flow using an appropriate observation device, without the remaining particles, which are situated in the central flow, being able to interfere with, or even prevent, viewing of the particles to be examined. Thus, an accumulation of particles to be examined in an observation plane is achieved with the aid of the apparatus according to the invention for examining particles in a liquid to be examined. Additionally, an alignment of the particles to be examined in accordance with the orientation of the observation plane is obtained with the aid of the acoustic waves, and so said particles can be observed well. A propagation direction of the acoustic waves perpendicular to the observation plane is chosen for the purpose of aligning the particles. Consequently, it is possible to dispense with an addition of polymer substances for aligning the particles to be examined, as is often applied conventionally, or it is at least possible to reduce the duration for which the particles to be examined are exposed to the polymers for the purpose of their alignment. Since the aforementioned polymer substances can undesirably change the outer form of the particles to be examined if the effect of said polymer substances thereon lasts for too long, it is particularly advantageous to be able to restrict or even entirely dispense with the application thereof. Thus, this allows the quality of the particles to be observed to be maintained and nevertheless renders an ideal alignment of these particles achievable such that they are aligned according to an orientation of an observation plane.

The fact that the particles to be examined are lifted out of the particle flow into another plane and are therefore withdrawn from the flow of the liquid to be examined such that the constituents situated in the main flow have no interfering influence on an observation of the particles to be examined can be very advantageous, for example when examining blood, to the extent that it is possible to use undiluted blood, which has a higher viscosity than diluted blood, for the examination, in contrast to conventional procedures. However, it is therefore particularly suitable for laminar flows, as occur in the described apparatus according to the invention. There is no mixing of the sheath liquids with the central flow in the case of laminar flows, and so a separation of particles from the central flow can be implemented particularly effectively.

The apparatus according to the invention for microscopic observation of particles in a liquid to be examined comprises an apparatus according to the invention for examining particles in a liquid to be examined. Moreover, the apparatus according to the invention for microscopic observation of particles in a liquid to be examined has a microscope, which is arranged at a longitudinal position of the first flow passage for the purpose of observing particles of the liquid to be examined in the observation plane. In particular, such a microscope can be an optical microscope; however, it can also be an electron microscope or a microscope of another type suitable for observing liquids. By way of example, individual particles to be examined can be identified and counted using the microscope. Furthermore, the particles to be examined can be differentiated or classified with the aid of the microscope. By way of example, it is possible to distinguish between leukocytes, thrombocytes and erythrocytes. Moreover, a subdivision of the observed particle types into subtypes can also be undertaken. By way of example, leukocytes can be classified according to five different subtypes.

It is also possible to observe details of the particles to be examined. On account of the separation of the particles to be examined and the displacement of these particles into the observation plane or the observation region of the microscope, it is possible to restrict the observation to the particles to be examined, without interfering particles impeding the view. Since the interfering particles do not occur, or only occur to a restricted extent, in the observation region during an observation of a liquid containing the particles to be observed, they need not be additionally surveyed and possibly discarded, and so an observation and analysis of the liquid containing the particles to be observed is significantly simplified and significantly accelerated on account of the lower number of particles to be monitored.

The particles to be monitored are displaced by the acoustic force or the force of the sound waves into the examination plane or observation plane of a microscope in a targeted manner in order to accumulate said particles there or in order to deplete the smaller particles, such as, e.g., erythrocytes or thrombocytes, in relation to the larger particles, in particular the leukocytes. In this way, it is possible to obtain a 200-2000-fold accumulation of leukocytes, for example.

In the method according to the invention for examining particles in a liquid to be examined, a liquid to be examined is moved through a flow passage at a first flow rate. Moreover, at least one sheath liquid is introduced through a first inlet into the flow passage at at least one second flow rate such that the at least one sheath liquid forms a first sheath flow in the flow passage and the liquid to be examined flows through the flow passage alongside the at least one sheath flow. Furthermore, sound waves are produced in piezo-acoustic fashion. The sound waves propagate through the flow passage transversely to or across the flow direction of the liquid to be examined and form a wave node in an observation plane such that, on account of the effect of pressure of the sound waves in the transverse direction, particles to be examined of the liquid to be examined are displaced into the observation plane and are accumulated there. In the process, the value of the at least one second flow rate is chosen in such a way that the at least one sheath flow has a predetermined cross section such that the observation plane extends through the at least one sheath flow and the particles to be examined are accumulated in the at least one sheath liquid. Then, the particles to be examined that are displaced into the observation plane or the observation region can easily be observed with an optical observation unit, such as a microscope, for example.

In the use according to the invention, use is made of a flow cell and a wave-producing device for piezo-acoustic production of sound waves, in particular of an apparatus according to the invention for examining particles in a liquid to be examined, for the purpose of separating leukocytes from a blood plasma. As already mentioned, a problem arising during the conventional observation of leukocytes is that these are only present in the blood at a low concentration. Therefore, an observation or examination of the leukocytes without the separation thereof leads to the red blood cells also having to be considered and discarded in the process. Advantageously, the circumstance that the white blood cells move more quickly under the influence of the sound waves than the other constituents of the blood is employed in the use of the apparatus according to the invention. Using this circumstance, it is now possible to shift the white blood cells across the flow direction in, and separate these from, a blood plasma flowing past with the aid of sound waves. The observation of the number of separated white blood cells which is small in comparison with the large number of red blood cells can subsequently be carried out with much less outlay, and so the observation time is advantageously significantly reduced.

The essential components of the apparatus according to the invention for examining particles in a liquid to be examined can be embodied predominantly in the form of software components. In particular, this relates to parts of the wave-producing device, such as a control device for controlling the production of sound waves, for example. Furthermore, this also relates to control units that are used to control the flow rates of the liquids flowing to the flow passage by way of the inlets.

However, in principle, these components can also be realized in part in the form of software-assisted hardware, for example FPGAs or the like, particularly where particularly fast calculations are involved. Likewise, the required interfaces can be embodied as software interfaces, for example if all that is involved is an adoption of data from other software components. However, they can also be embodied as interfaces constructed as hardware, which are actuated by suitable software.

A realization largely in the form of software is advantageous in that control devices that have already been used previously can be retrofitted in a simple manner by way of a software update in order to operate according to the invention. In particular, the object is also achieved by a corresponding computer program product having a computer program, which can be loaded directly into a memory device of a control device of the apparatus according to the invention for examining particles in a liquid to be examined, having program portions to carry out all steps of the method according to the invention when the program is executed in the control device. In addition to the computer program, such a computer program product can possibly comprise additional components, such as documentation, for example, and/or additional components, including hardware components, such as hardware keys (dongles, etc.), for example, for using the software.

A computer-readable medium, for example a memory stick, a hard disk drive or any other transportable or securely installed data medium, on which the program portions of the computer program that can be read and executed by a computer unit of the control device are stored, can serve the purpose of transportation to the control device and/or the purpose of storage on or in the control device. By way of example, the computer unit can have one or more cooperating microprocessors or the like to this end.

The dependent claims and the following description in each case contain particularly advantageous configurations and developments of the invention. Here, in particular, the claims of one claim category can also be developed in analogous fashion to the dependent claims of another claim category. Moreover, the various features of different exemplary embodiments and claims can also be combined to form new exemplary embodiments within the scope of the invention.

In one configuration of the apparatus according to the invention for examining particles in a liquid to be examined, the flow passage has a first inlet, through which a first sheath liquid flows into the flow passage at a second flow rate. Furthermore, the flow passage comprises a second inlet lying opposite the first inlet, a second sheath liquid flowing through said second inlet into the flow passage at a third flow rate. The first inlet and the second inlet are arranged opposite one another in such a way that the first sheath liquid forms a first sheath flow in the flow passage and the second sheath liquid forms a second sheath flow in the flow passage such that the liquid to be examined flows through the flow passage between the first sheath flow and the second sheath flow. The value of the second flow rate and of the third flow rate is chosen in such a way that the sheath flows have a predetermined cross section such that the observation plane extends through one of the two sheath flows. With the aid of the two sheath flows, it is possible to set a position of the central flow of the liquid to be examined in the cross section of the flow passage or in a transverse direction to the flow direction. In particular, what this can achieve is that the central flow no longer flows in the observation plane such that particles to be examined can be lifted out of the central flow into the observation plane. The use of two sheath flows allows free positioning of the central flow and greater flexibility when choosing the observation plane into which the particles to be examined are transferred, where they can be observed with the aid of an observation appliance, such as a microscope, for example.

In one configuration of the apparatus according to the invention for examining particles in a liquid to be examined, the flow passage is dimensioned in such a way that the liquids flowing there through exhibit laminar flow. By way of example, this can be achieved by virtue of the flow passage comprising a microfluidic channel. Whether laminar flow prevails in the flow passage depends on the diameter of the flow passage and on the speed of the liquids flowing there through and the viscosity thereof. Thus, given a flow rate and viscosity, the diameter of the flow passage is appropriately chosen such that the liquids passing through the flow passage are able to flow through in laminar fashion. The presence of a laminar flow is advantageous in that no turbulences, which could lead to unwanted mixing of the central flow and sheath flow, occur in the flow passage.

In a preferred configuration of the method according to the invention for examining particles in a liquid to be examined, the liquid to be examined comprises blood plasma. As already mentioned, the apparatus according to the invention for examining particles in a liquid to be examined is particularly well suited to separating and subsequently observing leukocytes, which occur in a relatively low concentration in the blood plasma.

In the apparatus according to the invention for examining particles in a liquid to be examined, the position of the nodes of the acoustic waves is preferably set in the transverse direction by setting the frequency of the sound waves. The position of the nodes in the transverse direction to the flow direction depends on the wavelength of the standing waves and hence on the frequency used to excite the waves. In this way, it is possible to set the position of the wave nodes to a desired position of an observation plane or to a central region of an observation region in the transverse direction to the flow direction.

In a particularly preferred variant of the apparatus according to the invention for examining particles in a liquid to be examined, the particles to be examined have leukocytes or erythrocytes of thrombocytes. The described accumulation method can also be applied to the accumulation of erythrocytes. Erythrocytes have a size of 5 to 6 µm and are twice as large as thrombocytes, which have a size of approximately 1.5 to 3.5 µm. Consequently, it is also possible to separate the erythrocytes from the thrombocytes with the aid of sound waves. Additionally, an additional process stage could also be disposed downstream of the described process stage, said additional process stage additionally separating the leukocytes from the erythrocytes and operating in analogous fashion to the described process stage.

As the smallest particles, thrombocytes can be separated by virtue of all other blood constituents, i.e., the leukocytes and the erythrocytes, being separated as described and the central flow with the thrombocytes being steered into the observation plane.

Particularly preferably, the apparatus according to the invention for examining particles in a liquid to be examined has a separation stage disposed upstream of the process stage. Here, the separation stage comprises an additional flow passage with a central flow with a liquid that is initially free from the particles to be examined and at least one sheath flow, referred to as separation stage sheath flow below, that flows through the flow passage of the separation stage alongside the central flow and that has the liquid to be examined. Preferably, the at least one separation stage sheath flow surrounds the central flow. In this context, the central flow should be considered to be a liquid flow next to which at least one further liquid flow, in this case a sheath flow, flows in parallel. As described, the central flow is preferably surrounded by the at least one sheath flow such that it then flows centrally through the flow passage.

In this variant, the separation stage moreover has an additional wave-producing device for piezo-acoustic production of sound waves that propagate through the flow passage of the separation stage transversely to the flow direction of the liquid to be examined and that form a wave node in a plane through the central flow such that, on account of the effect of pressure of the sound waves in the transverse direction, particles, in particular particles with a larger diameter in comparison with other particle types in the liquid to be examined, are displaced into the central flow and are accumulated there. Thus, in this particularly advantageous variant, there is an additional separation of the particles to be examined from the liquid to be examined prior to the separation of the particles to be examined and the displacement thereof into the observation plane, and so the reliability and effectiveness of the separation of the particles to be examined is increased.

In a variant of the apparatus according to the invention for examining particles in a liquid to be examined that can be applied particularly advantageously, the liquid that is initially free from the particles to be examined is transparent. The high transparency of the liquid that is free from the particles to be examined allows a simplified observation of particles to be examined that have been transferred into this liquid.

In a particularly advantageous configuration of the apparatus according to the invention for examining particles in a liquid to be examined, the wave-producing devices of the separation stage and of the process stage are embodied in such a way that the propagation direction of the sound waves in the separation stage and the propagation direction of the sound waves in the flow passage of the process stage extend orthogonal to one another and orthogonal to the flow direction of the liquid to be examined.

Alternatively, the separation stage and the process stage can be embodied in such a way that the separation in the separation stage and the subsequent displacement of the central flow in the process stage proceed in the same direction.

To this end, it is possible either to interchange the dimensions of a channel that defines the flow passage or the flow path or to position the wave-producing device laterally instead of in the vertical direction.

The alignment of the propagation direction of the acoustic waves is determined by the geometric form of the conduit elements surrounding the flow passage and by the alignment and position of an observation unit to be arranged thereon, such as an observation microscope, for example.

In a special variant of the apparatus according to the invention for examining particles in a liquid to be examined, the flow passage of the process stage widens across the flow direction upstream of the longitudinal position of the wave-producing device of the process stage such that the flow speed of the liquid to be examined and of the at least one sheath liquid is reduced. As a consequence of the lower flow speed, the particles to be examined can be observed and analyzed more easily as there is more time in which the particles are situated in the observation region of an employed observation appliance.

Preferably, the apparatus according to the invention for examining particles in a liquid to be examined has a buffer supply unit. Here, the buffer supply unit is configured to add a buffer to the hypotonic solution into the central flow or the liquid to be examined. With the aid of the additional buffer, particles with a higher intracellular osmotic pressure are dissolved while particles with a lower intracellular osmotic pressure are maintained.

When separating white blood cells from a blood plasma, red blood cells are dissolved with the aid of the additional buffer solution on account of their higher intracellular osmotic pressure, while white blood cells are maintained. This measure consequently facilitates a further improved separation of white blood cells to be examined from the blood plasma.

Particularly preferably, the apparatus according to the invention for examining particles in a liquid to be examined has a unit, which is preferably connected to the second inlet and configured to add markers for the target particles to the at least one sheath liquid. Markers can have specific chemical properties such that they only bind to certain constituents to be analyzed of a liquid to be examined. By way of example, they can have a specific color and thus easily identify the constituents of interest in the liquid to be examined. The use of markers thus facilitates the traceability of particles to be observed in a liquid to be examined. Markers can also have specific physical properties, which facilitate, or even make possible in the first place, a separation of the particles they are attached to. By way of example, particles that are difficult to separate in principle could be provided with suitable markers such that the above-described separation methods can be applied in an easier and more effective manner. Occasionally, a situation may arise in which different particles present in a liquid have approximately the same size and it would therefore be difficult to separate these from one another with sound waves. If the particles of interest are now provided with appropriately largely dimensioned markers, there can nevertheless be a separation of the particles of interest with the aid of sound waves.

Moreover, the apparatus according to the invention for microscopic observation of particles in a liquid to be examined can have a collecting unit that is arranged downstream of the process stage and downstream of the longitudinal position of the microscope and is configured to collect the examined particles. The collected particles can subsequently be examined further using a further examination method which requires an accumulation of the examined particles, preferably molecular biological measuring methods. In this way, the separation and accumulation of particles to be examined, achieved with the aid of the apparatus according to the invention, can be used multiple times and for various examinations in succession.

Additionally, the apparatus according to the invention for microscopic observation of particles in a liquid to be examined can have a particle transfer device that is arranged downstream, i.e., downstream of the process stage, behind the longitudinal position of the microscope and is embodied to transfer the particles, in particular the examined particles, from the flow passage onto an object carrier for the further examination of the particles. By way of example, such a transfer device can be part of the described collecting unit and can have an opening through which liquid droplets that have the examined particles accumulated therein are moved such that they subsequently fall onto an object carrier. The object carrier can be used as a transportation means for transporting the examined particles to another position, at which further examinations are carried out.

BRIEF DESCRIPTION OF THE DRAWINGS

Below, the invention will once again be explained in more detail on the basis of exemplary embodiments, with reference being made to the attached figures. In the figures:

FIG. 2 shows a schematic illustration of a separation process of white blood cells in a separation stage, FIG. 3 shows a schematic illustration of a displacement of white blood cells into an observation plane, FIG. 6 shows a flowchart that elucidates the progress of a method for examining white blood cells according to an exemplary embodiment of the invention.

DETAILED DESCRIPTION

Figure 1:
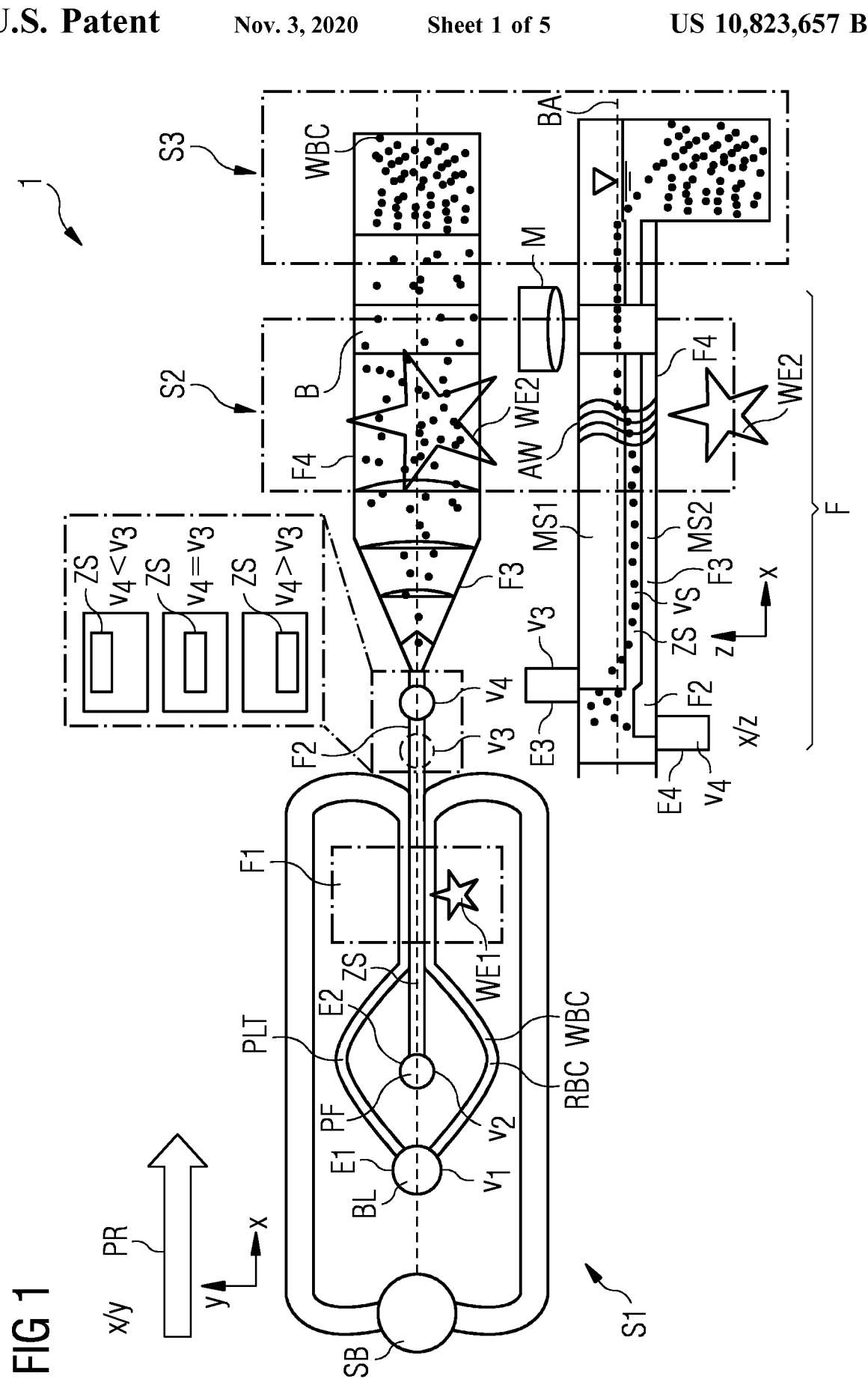
FIG. 1 shows a schematic illustration of an apparatus for examining white blood cells according to an exemplary embodiment of the invention.

A first exemplary embodiment of an apparatus 1 for examining white blood cells WBC is described in conjunction with FIG. 1 to FIG. 3.

FIG. 1 shows a plan view of a microfluidic channel system 1, which serves as a flow cell for examining white blood cells WBC and constitutes an apparatus for examining particles in a liquid to be examined according to an exemplary embodiment of the invention. The microfluidic channel system comprises a separation stage S1, a process stage S2 disposed downstream of the separation stage and a collecting unit S3 following the process stage. The plan view is on the xy-plane. Here, the flow direction of the liquid to be examined is the x-direction. Additionally, the part depicted on the right-hand side of FIG. 1, i.e., the process stage S2 comprising a flow passage F and the collecting unit S3 of the microfluidic channel system 1, is illustrated in a side view, i.e., in the xz-plane, at the bottom right in the image. As shown, the collecting unit S3 includes a container for receiving liquid flowing from flow passage F1.

The microfluidic channel system 1 has a separation stage S1. The separation stage S1 comprises a first inlet E1, in which blood plasma BL flows into the microfluidic channel system 1 at a first flow rate $v_1$. Additionally, the microfluidic channel system 1 comprises a second inlet E2, through which a liquid PF that is free from the blood plasma, in this case a buffer liquid PF, flows in at a second flow rate $v_2$. The two liquids BL, PF are merged in a flow passage F1 or in a first flow passage portion F1, to be precise in such a way that the buffer liquid PF forms a central flow ZS and the blood plasma BL forms a separation stage sheath flow MS around the buffer liquid PF, which sheath flow flows past the central flow ZS on the outside on both sides. On account of the small dimensions of the microfluidic channel 1 (the width is between 100 and 1500 μm and the height is approximately 30 to 500 μm), the central flow ZS and the separation stage sheath flow MS each have a laminar property at typical flow speeds, and so these flow past one another without mixing. The blood plasma BL to be examined flows past the central flow ZS on both sides and finally flows back to an outflow region SB after completing its passage through the first flow passage portion F1, said outflow region being illustrated on the side of the first inlet E1 lying opposite the second inlet E2, i.e., to the far left, in FIG. 1. In the exemplary embodiment shown in FIG. 1, the blood plasma BL comprises red blood cells RBC, white blood cells WBC and blood platelets PLT.

A first wave-producing device WE1 for piezo-acoustic production of sound waves AW is also arranged at the first flow passage portion F1 (see FIG. 2). The first wave-producing device WE1 is symbolized by a star in FIG. 1. Sound waves AW propagating perpendicularly to the flow direction are produced with the aid of the first wave-producing device WE1 (see FIG. 2), the sound waves forming wave nodes KN in a central region of the first flow passage portion F1, in which the central flow ZS flows. On account of their size, white blood cells WBC, which reside in the separation stage sheath flow MS, are deflected by the sound waves AW with a higher speed in the direction of the central flow ZS than other constituents of the blood BL, such as red blood cells RBC or blood platelets PLT, for example. In this way, there is a first accumulation of white blood cells WBC in the central flow ZS in the first flow passage portion F1.

Within the further course of the process PR, there now is a transition of the central flow ZS into a process stage S2 of the microfluidic channel system 1. The process stage S2 comprises a flow passage F having a second flow passage portion F2, a third flow passage portion F3 and a fourth flow passage portion F4. A buffer liquid PF1 flows out of a third inlet E3 at a third flow rate $v_3$ into the second flow passage portion of the flow passage F and a buffer liquid PF2 flows from a fourth inlet E4, lying opposite the third inlet E3 in the z-direction, at a fourth flow rate $v_4$ into the second flow passage portion of the flow passage F. The two buffer liquids PF1, PF2 in each case form a first and a second sheath flow MS1, MS2, respectively, and restrict the central flow ZS with the white blood cells WBC to a region lying between the two sheath flows MS1, MS2, said region not lying in an observation plane or an observation region BA of a microscope M that is subsequently used for observation purposes (see also FIG. 3). This flow structure is obtained in a third flow passage portion F3. In the third flow passage portion F3, the microfluidic channel 1 is widened in the y-direction, i.e., transversely to the flow direction, in order to reduce the speed of the first and second sheath flows MS1, MS2 and of the central flow ZS. Slowing down the flow speeds is necessary so that individual white blood cells WBC can subsequently be observed using a microscope M. As may be identified in a magnified illustration in FIG. 1, the position of the central flow ZS depends on the magnitude of the flow rates $v_3$, $v_4$ of the first and second sheath flows. If $v_4 < v_3$, the central flow is displaced upward in the z-direction. If $v_4 = v_3$, the central flow ZS lies exactly in the center of the cross section of the flow passage F when observed in the z-direction, and if $v_4 > v_3$, the central flow ZS lies below the center of the cross section of the flow passage F when observed in the z-direction.

In a fourth flow passage portion F4, sound waves AW that propagate perpendicular to the flow direction, albeit propagating in the z-direction in this case instead of propagating in the y-direction, are once again produced with the aid of a second wave-producing device WE2 (symbolized as a star in FIG. 1). The sound waves AW, which are preferably standing waves, once again have wave nodes KN; however, the latter do not lie in the flow region of the central flow ZS in this case, but instead lie adjacently in the flow region of one of the two sheath flows MS1, MS2 (in FIG. 3, the nodes KN lie in the first sheath flow MS1). However, the wave nodes lie in the observation plane BA or, when observed in the z-direction, level with the observation region BA of the microscope M. On account of the size differences already explained above, the white blood cells WBC are now once again deflected with preference into the observation plane BA; i.e., they enter the first sheath flow MS1 (see FIG. 3), through which the observation plane BA of the microscope M also extends. The first sheath flow MS1 is preferably colorless such that the white blood cells WBC situated in the first sheath flow MS1 can be easily identified. The white blood cells WBC are now observed in an observation portion B arranged at the end of the fourth flow passage portion F4, perpendicular to the flow direction thereof, by means of a microscope M that is positioned perpendicular to the flow direction, i.e., aligned in the z-direction, at the fourth flow passage portion F4. By way of example, the white blood cells WBC can be counted with the aid of the microscope M and/or the structure and makeup thereof can be observed. Subsequently, the white blood cells WBC are collected in a third portion of the microfluidic channel system 1, which is also referred to as collecting region S3, it then additionally being possible to use said white blood cells subsequently for further examinations.

FIG. 2 shows, in a magnified manner, the process of separating white blood cells WBC in the first flow passage portion F1 of the separation stage S1 and the accumulation thereof in a central flow ZS comprising a buffer solution. As already explained, the white blood cells WBC, which are situated in the separation stage sheath flow MS, are deflected with the aid of sound waves AW in the direction of the central region of the first flow passage portion F1, where they remain on the central axis of the first flow passage portion F1 in the central flow ZS on account of the arrangement of the nodes KN of the sound waves AW. The nodes KN are indicated by crossing lines. The sound waves AW are reflected on the side of the edge of the first flow passage portion F1 lying opposite the sound-wave-producing device WE1 and form standing waves, which form the sketched wave nodes. The acoustic waves AW allow the larger cells, in this case the white blood cells WBC (approximate diameter of 7 to 15 μm), to move faster in the direction of the central region of the first flow passage portion F1 than smaller cells, such as red blood cells RBC (approximate dimensions of 5 to 6 μm), for example. In the central region of the first flow passage portion F1, where the nodes KN of the acoustic waves AW are situated, the white blood cells WBC are only moved by the laminar central flow ZS and consequently are moved along the central axis of the microfluidic channel 1 in the downstream direction, i.e., in the process direction PR. During the change in position of the white blood cells WBC perpendicular to the flow direction, the white blood cells WBC are transferred into another medium, the medium of the central flow ZS. The central flow ZS is free from other particles and therefore highly transparent. The diameter of the separation stage sheath flow MS and of the central flow ZS or the position thereof and the accumulation of the white blood cells WBC in the central flow ZS can be influenced with the aid of the flow rates $v_1$ and $v_2$ of the sheath flow MS and of the central flow ZS, respectively. In the case of a ratio of the first flow rate $v_1$ to the second flow rate $v_2$ of 10, an accumulation of white blood cells WBC is achieved in the central flow ZS; conversely, this is linked to a greatly reduced proportion of the red blood cells in the central flow ZS in comparison with the blood plasma BL in the separation stage sheath flow MS.

As already mentioned, the central flow ZS flows further in the downstream direction to a process stage S2 and, there, past a third and a fourth inlet E3, E4, from which first and second sheath flows MS1, MS2 with third and fourth flow rates $v_3$, $v_4$ flow into the microfluidic channel 1, in a second flow passage portion F2. The two first and second sheath flows MS1, MS2 control the positioning of the central flow ZS in the z-direction. This scenario is shown in magnified fashion in FIG. 3. Firstly, the extent of the central flow ZS, which has a flow rate $v_s$, is restricted in the z-direction by the first and second sheath flows MS1, MS2; secondly, the position of the central flow ZS is set by virtue of choosing the third and fourth flow rates $v_3$, $v_4$ of the two sheath flows MS1, MS2 in such a way that the central flow ZS lies outside of an observation plane or an observation region BA of a microscope M, which is arranged at an observation position or an observation portion B of the microfluidic channel 1. This positioning of the central flow ZS is effectuated in a third flow passage portion F3. The flow rate of the central flow ZS, initially denoted by $v_2$, naturally remains the same; however, the cross section or the cross-sectional area of the central flow ZS changes after the second flow passage portion F2. In order to indicate this, the reference sign "$v_s$" is used from the third flow passage portion F3 onward. From the third flow passage portion F3, the cross section of the central flow ZS depends on the flow rates of the first and second sheath flows MS1, MS2.

In order to further accumulate the white blood cells WBC and in order to keep red blood cells RBC still present in the central flow ZS out of the observation region BA, the central flow ZS is kept in a non-centric position within the microfluidic channel 1 with the aid of the first and second sheath flows MS1 and MS2.

Within the further course of the process PR, acoustic waves AW with a propagation direction transverse to the flow direction and wave nodes KN in the observation plane or in the observation region BA that is restricted in the z-direction are produced in a fourth flow passage portion F4 with the aid of a second wave-producing device WE2. Consequently, the larger white blood cells WBC are displaced into the first sheath flow MS1 and hence into the observation plane BA as a consequence of the pressure of the sound waves AW, while the smaller red blood cells RBC mostly remain in the central flow ZS. On account of the significantly larger forces of the acoustic waves AW in comparison with the flow forces of the central flow ZS and of the two sheath flows MS1, MS2, the white blood cells WBC have ample time to change to the first sheath flow MS1 before they enter the observation portion B. There, the white blood cells WBC can easily be observed in the transparent buffer solution PF1 of the first sheath flow MS1. On account of its restricted depth of field, the microscope M has an observation region BA that is restricted in the z-direction. By virtue of shifting the white blood cells WBC exactly into this observation region BA, they can be observed with an optimal resolution.

Figure 4:
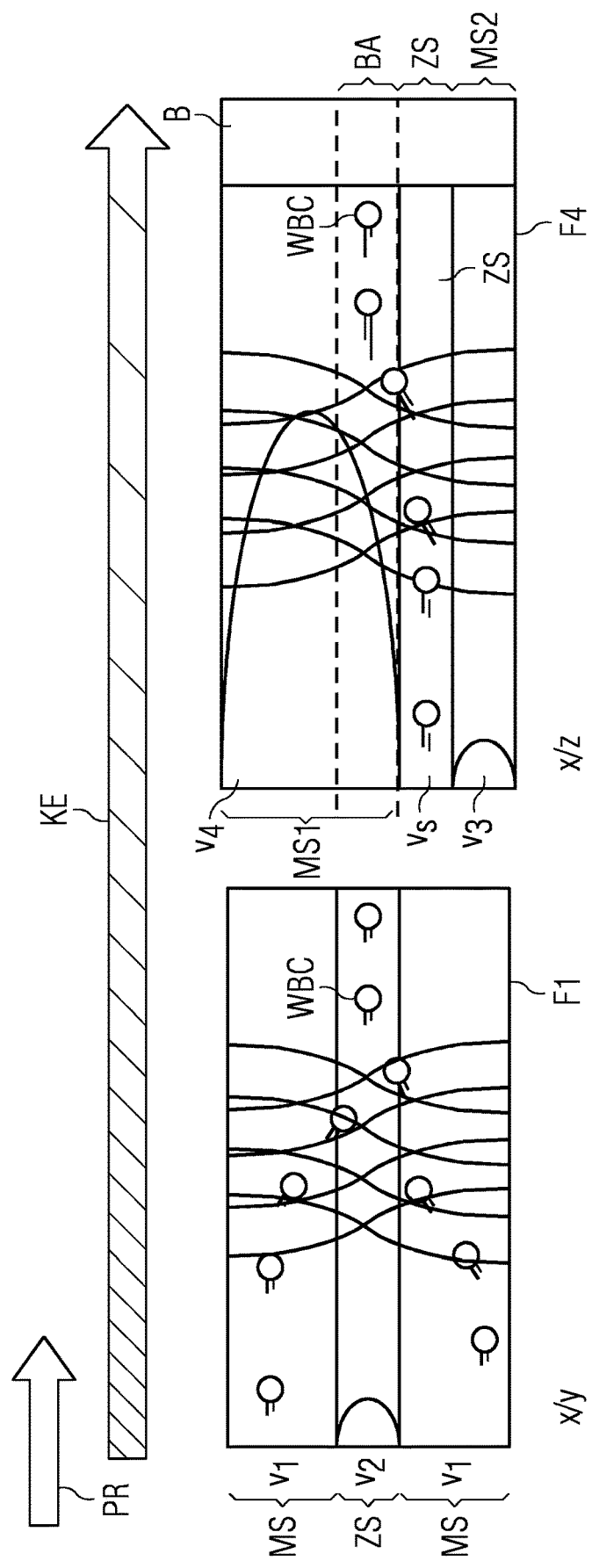
FIG. 4 shows an overview of the separation and displacement processes in an apparatus for examining white blood cells when using a hypotonic solution according to an exemplary embodiment of the invention.

FIG. 4 once again elucidates the two-stage separation and positioning process, elucidated in FIG. 1 to FIG. 3, by way of a sequential illustration of the two separation and positioning processes, with a hypotonic buffer being additionally added to the central flow ZS in the first flow passage portion F1 in the exemplary embodiment according to FIG. 4. While a first accumulation of white blood cells WBC in a central flow ZS in the first flow passage portion F1 is achieved by displacing the white blood cells WBC in the y-direction and while these remain unaffected by the hypotonic buffer, red blood cells, which undesirably likewise reach the central flow ZS from the separation stage sheath flow MS, are progressively dissolved by the hypotonic conditions in the central flow ZS, and so the concentration of the red blood cells in the central flow ZS gradually reduces. This is elucidated by the hatching of an arrow KE that symbolizes the concentration of the red blood cells, with greater distances between hatching lines intending to indicate a lower concentration of red blood cells.

Subsequently, this central flow ZS is decentered in the z-direction in a second flow passage portion F2 (see FIG. 1). After the widening of the liquid flows ZS, MS1, MS2 in the y-direction, white blood cells WBC are once again separated in a fourth flow passage portion F4 (see right-hand side of FIG. 4), albeit this time from the central flow ZS in the z-direction into a first sheath flow MS1. There, the white blood cells WBC are kept in a z-region corresponding to the observation region BA and said white blood cells subsequently reach the longitudinal position B (see FIG. 1), at which a microscope M is arranged, in the downstream direction. During the passage through the fourth flow passage portion F4, red blood cells that may still be present in the central flow ZS also continue to be dissolved. As already mentioned, the concentration of the red blood cells in the central flow ZS, which continuously reduces in the downstream direction, is intended to be symbolized with the aid of the arrow KE extending in the process direction PR, and so almost exclusively white blood cells WBC are present in the observation region BA just in front of the position B of the microscope M. Additionally, colored markers, such as SDS, for example, can be added to the first sheath flow MS1 by way of a marker supply unit connected to the fourth inlet E4 in the second flow passage portion F2, the markers modifying the morphology of the cells.

Figure 5:
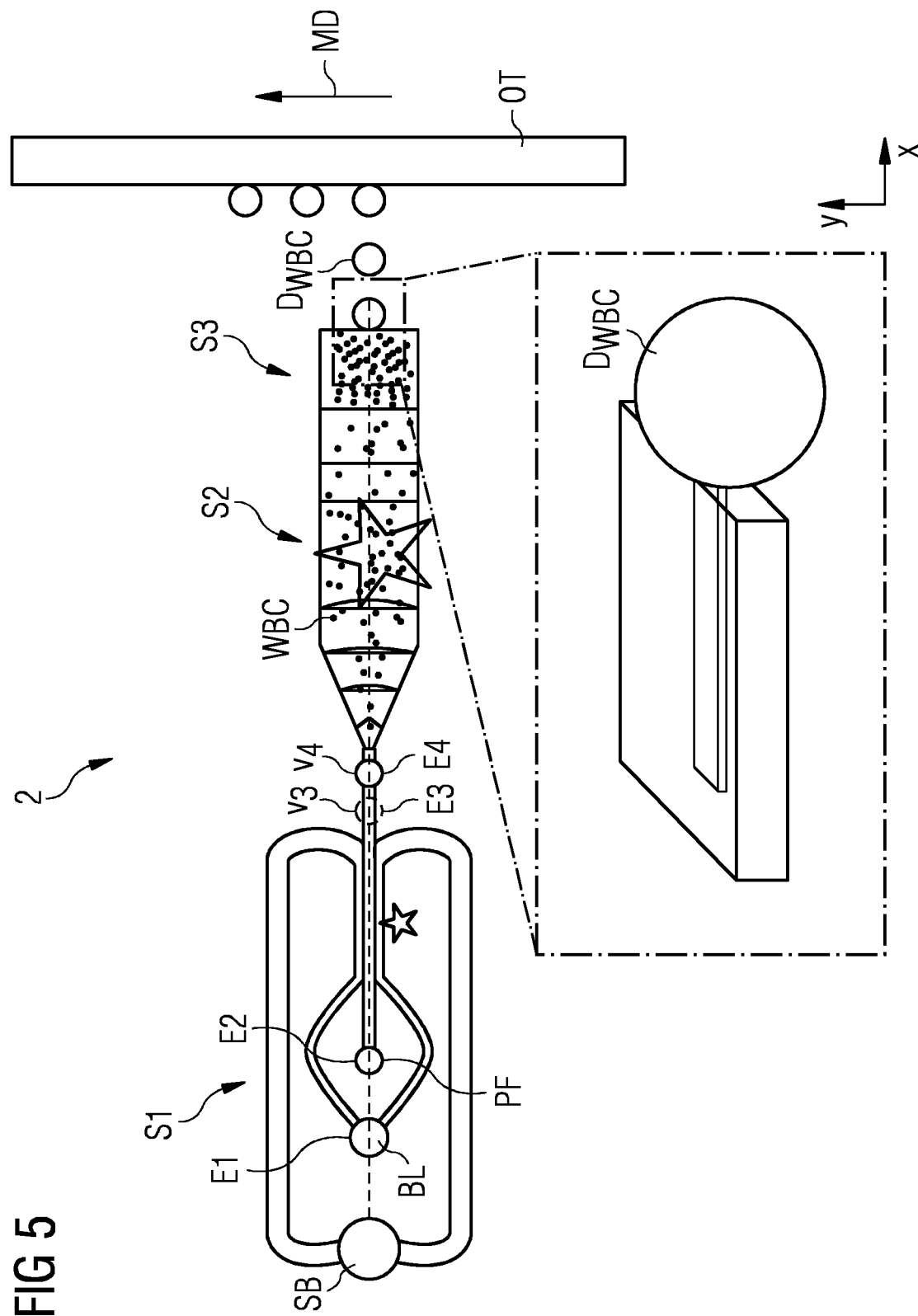
FIG. 5 shows a schematic illustration of an apparatus for examining white blood cells according to an exemplary embodiment of the invention with a downstream object carrier.

FIG. 5 portrays a schematic illustration of a microfluidic channel system 2 for examining white blood cells WBC according to an exemplary embodiment of the invention with a downstream object carrier OT. The construction of the microfluidic channel system 2 shown in FIG. 5 largely corresponds to that of the system 1 shown in FIG. 1. However, the system 2 shown in FIG. 5 also additionally comprises an object carrier OT, on which drops $D_{WBC}$ with a defined volume of, e.g., 20 to 35 µl and containing white blood cells WBC fall (gravity in the x-direction) from the collecting region S3 of the microfluidic channel system 2. The object carrier OT can be moved in the movement direction MD, in this case in the y-direction, such that the individual drops $D_{WBC}$ with the white blood cells WBC come to rest in succession and in ordered fashion on the object carrier OT. The drops $D_{WBC}$ on the object carrier OT can be subsequently treated with the aid of various standard staining technologies for cell identification purposes, such as Hoechst staining, for example. As a consequence of the great accumulation of the white blood cells WBC with the aid of the method according to the invention, the identification of pathologies of white blood cells WBC, for example, is facilitated with a much higher statistical significance than is currently the case, for example, with the aid of a Giemsa staining of white blood cells WBC in a non-accumulated blood sample.

FIG. 6 shows a flowchart 600 that is used to elucidate the progress of a method for examining white blood cells according to an exemplary embodiment of the invention. In step 6.I, blood plasma BL is introduced in a separation stage S1 into a peripherally arranged supply system of a first flow passage portion F1 of a microfluidic channel system 1 via a first inlet E1. In step 6.II, a second inlet E2 of the microfluidic channel system 1 is opened, by way of which a buffer solution PF flows into a centrally arranged supply of the first flow passage portion F1. While the blood flowing through the first inlet E1 forms a separation stage sheath flow MS with a first flow rate $v_1$ in the first flow passage portion F1, the buffer solution PF flowing centrally through the flow passage F1 forms a central flow ZS with a second flow rate $v_2$. In step 6.III, sound waves AW, which propagate transverse to the flow direction of the first flow passage portion F1 of the microfluidic channel system 1, are now produced by a sound-wave-producing device, for example with the aid of piezo-elements. As a consequence of the pressure in the transverse direction of the first flow passage portion F1, arising as a result of the sound waves AW, white blood cells WBC are increasingly transferred from the separation stage sheath flow MS into the central flow ZS such that they accumulate in the buffer solution PF forming the central flow ZS. In step 6.IV, after the transition into a process stage S2 with a flow passage F, a third inlet E3 and a fourth inlet E4 are now actuated in a second flow passage portion F2 of the flow passage F in such a way that highly transparent buffer solutions PF1, PF2 flow into the second flow passage portion F2 of the microfluidic channel system 1 and form first and second sheath flows MS1, MS2 that surround the central flow ZS in the z-direction. Here, the flow rates $v_3$, $v_4$ of the first and second sheath flows MS1, MS2 are selected in such a way that the central flow ZS in the z-direction, i.e., in the observation direction of a microscope, is decentered, i.e., the central flow ZS is displaced in the z-direction such that it no longer flows in a subsequent observation plane BA.

After the flow passage F has widened in a third flow passage portion F3 such that the flow speed both of the central flow ZS and of the first and second sheath flows MS1, MS2 is reduced, sound waves AW are once again produced in the transverse direction to the flow direction in a fourth flow passage portion F4 of the flow passage F during a step 6.V, said sound waves propagating transverse to the flow direction of the flow passage portion F4 of the flow passage F of the microfluidic channel system 1. As a consequence of the pressure in the transverse direction of the flow passage portion F4, arising due to the sound waves AW, white blood cells WBC are increasingly transferred from the decentered central flow ZS into one of the first and second sheath flows MS1, MS2. The sound waves AW form standing waves, the wave nodes of which are positioned in the z-direction in such a way that, when observed in the z-direction, they are arranged level with or in an observation plane that extends through an observation region BA of a microscope M arranged downstream. In a step 6.VI, the white blood cells WBC pass a longitudinal position B of the microfluidic channel system 1, at which a microscope M is arranged. The white blood cells WBC positioned in the z-direction in the observation region BA of the microscope M are now observed using the microscope M. After the observation, the white blood cells WBC are collected in a collecting unit S3 in a step 6.VII and are subsequently output in droplet form onto an object carrier OT for further analyses in a step 6.VIII.

Finally, reference is once again made to the fact that the methods and apparatuses described above are merely preferred exemplary embodiments of the invention and that the invention can be varied by a person skilled in the art without departing from the scope of the invention, to the extent that it is specified by the claims. By way of example, the microfluidic channel arrangement 1 was described in the context of observation and analysis of white blood cells WBC. However, the invention is not restricted to the separation and observation of white blood cells WBC, but can also be applied to other blood cells or else other liquids than blood and particles occurring in these liquids. For sake of completeness, reference is also made to the fact that the use of the indefinite article "a" or "an" does not preclude the possibility of a plurality of the relevant features being present. Likewise, the term "unit" does not preclude these from consisting of several components, which may optionally also be distributed in space.

The invention claimed is:

1. An apparatus for examining particles in a liquid to be examined, the apparatus having a process stage for separating and positioning the particles to be examined, the process stage comprising:
    a flow passage through which the liquid to be examined is moved at a first flow rate, comprising at least one inlet, through which at least one sheath liquid flows into the flow passage at at least one second flow rate such that the at least one sheath liquid forms at least one sheath flow in the flow passage and the liquid to be examined flows through the flow passage longitudinally in a flow direction surrounded in the transverse direction by the at least one sheath flow, and
    a wave-producing device for piezo-acoustic production of sound waves that propagate through the flow passage transversely to the flow direction of the liquid to be examined and that form wave nodes in an observation plane such that, on account of the effect of pressure of the sound waves in the transverse direction, the particles to be examined of the liquid to be examined are displaced transversely into the observation plane and are accumulated there,
    wherein a value of the at least one second flow rate is chosen in such a way that the at least one sheath flow has a predetermined cross section such that the observation plane extends through the at least one sheath flow and the particles to be examined are accumulated in the at least one sheath liquid while the at least one sheath flow surrounds in the transverse direction the liquid to be examined.

2. The apparatus as claimed in claim 1, wherein the at least one inlet of the flow passage has a first inlet, through which a first sheath liquid flows into the flow passage at a second flow rate, and a second inlet lying opposite the first inlet, a second sheath liquid flowing through the second inlet into the flow passage at a third flow rate such that the first sheath liquid forms a first sheath flow in the flow passage and the second sheath liquid forms a second sheath flow in the flow passage and the liquid to be examined flows through the flow passage between the first sheath flow and the second sheath flow, wherein the value of the second flow rate and of the third flow rate is chosen such that the sheath flows have a predetermined cross section such that the observation plane extends in the flow direction through one of the two sheath flows.

3. The apparatus as claimed in claim 2, wherein the flow passage of the process stage widens across the flow direction upstream of the longitudinal position of the wave-producing device of the process stage such that the flow speed of the liquid to be examined and of the at least one sheath liquid is reduced.

4. The apparatus as claimed in claim 1, wherein the flow passage is dimensioned such that liquids flowing there through exhibit laminar flow or the flow passage comprises a microfluidic channel.

5. The apparatus as claimed in claim 1, wherein the liquid to be examined comprises blood plasma or the particles to be examined of the liquid to be examined have at least one of the following blood constituents:
leukocytes,
thrombocytes, and
erythrocytes.

6. The apparatus as claimed in claim 1, wherein the position of the nodes of the acoustic waves is set in the transverse direction by setting the frequency of the sound waves.

7. The apparatus as claimed in claim 1, the apparatus also having a separation stage disposed upstream of the process stage, wherein the separation stage comprises:
a flow passage with a central flow with a second liquid that is initially free from the particles to be examined, and at least one separation stage sheath flow that flows through the flow passage of the separation stage alongside the central flow and that has the liquid to be examined,
an additional wave-producing device for piezo-acoustic production of sound waves that propagate through the flow passage of the separation stage transversely to the flow direction of the liquid to be examined and that form a wave node in a plane through the central flow such that, on account of the effect of pressure of the sound waves in the transverse direction, the particles of the liquid to be examined are displaced into the central flow and are accumulated there.

8. The apparatus as claimed in claim 7, wherein the at least one separation stage sheath flow surrounds the central flow in the transverse direction to the flow direction or the liquid that is initially free from the particles to be examined is transparent.

9. The apparatus as claimed in claim 7, wherein the wave-producing devices are embodied such that the propagation direction of the sound waves in the separation stage and the propagation direction of the sound waves in the process stage extend orthogonal to one another and orthogonal to the flow direction of the liquid to be examined.

10. The apparatus as claimed in claim 7, having a buffer supply unit for adding a buffer to a hypotonic solution into the central flow or the liquid to be examined.

11. The apparatus as claimed in claim 1, having a marker supply unit, which is connected to the second inlet, for the addition of markers for the particles to be examined such that the second sheath flow comprises the markers.

12. An apparatus for microscopic observation of particles in a liquid to be examined, comprising:
an apparatus as claimed in claim 1, and
a microscope, which is arranged at a longitudinal position of the flow passage of the process stage, for observing particles of the liquid to be examined in the observation plane.

13. The apparatus as claimed in claim 12, further having:
a collecting unit that is arranged downstream of the process stage and downstream of the longitudinal position of the microscope and is configured to collect the examined particles in order to examine these further using a further examination method which requires an accumulation of the examined particles or
a particle transfer device that is arranged downstream behind the longitudinal position of the microscope and is embodied to transfer the particles from the flow passage onto an object carrier for further examination of the particles.

14. A method of using a flow cell and a wave-producing device for piezo-acoustic production of sound waves comprising the apparatus as claimed in claim 1, wherein the method comprises separating leukocytes from a blood plasma.

15. The apparatus as claimed in claim 1 wherein the liquid to be examined forms a non-centric central flow in the flow passage.

16. A method for examining particles in a liquid to be examined, having the following steps:
moving the liquid to be examined through a flow passage at a first flow rate,
supplying at least one sheath liquid to the flow passage through a first inlet at a second flow rate in such a way that the at least one sheath liquid forms at least one sheath flow in the flow passage and the liquid to be examined flows through the flow passage longitudinally in a flow direction surrounded in the transverse direction by the at least one sheath flow,
piezo-acoustically producing sound waves that propagate through the flow passage transversely to the flow direction of the liquid to be examined and form wave nodes in an observation plane such that, on account of the effect of pressure of the sound waves in the transverse direction, particles to be examined of the liquid to be examined are displaced transversely into the observation plane and are accumulated there, and
choosing a value of the at least one second flow rate in such a way that the at least one sheath flow has a predetermined cross section such that the observation plane extends in the flow direction through the at least one sheath flow and the particles to be examined are accumulated in the at least one sheath liquid while the at least one sheath flow surrounds in the transverse direction the liquid to be examined.

17. The method as claimed in claim 16 wherein the liquid to be examined forms a non-centric central flow in the flow passage.

* * * * *